(12) United States Patent
Matsui et al.

(10) Patent No.: US 6,683,559 B2
(45) Date of Patent: Jan. 27, 2004

(54) UNWANTED PEAK DETECTION FOR RADAR

(75) Inventors: Sadanori Matsui, Kobe (JP); Hisateru Asanuma, Kobe (JP)

(73) Assignee: Fujitsu Ten Limited (JP)

( * ) Notice: Subject to any disclaimer, the term of this patent is extended or adjusted under 35 U.S.C. 154(b) by 0 days.

(21) Appl. No.: 10/301,989

(22) Filed: Nov. 22, 2002

(65) Prior Publication Data

US 2003/0103000 A1 Jun. 5, 2003

(30) Foreign Application Priority Data

Nov. 30, 2001 (JP) .................................. 2001-367028

(51) Int. Cl.$^7$ ............................................. G01S 7/292
(52) U.S. Cl. ..................... 342/159; 342/192; 342/193
(58) Field of Search ........................ 342/70, 159, 162, 342/192, 193, 195

(56) References Cited

U.S. PATENT DOCUMENTS 5,751,240 A * 5/1998 Fujita et al. ................ 342/196
5,786,788 A * 7/1998 Schober et al. ............. 342/159
2003/0122703 A1 * 7/2003 Kishida et al. ............. 342/192

* cited by examiner

Primary Examiner—Ian J. Lobo
(74) Attorney, Agent, or Firm—Fogg and Associates, LLC; Laura A. Ryan

(57) ABSTRACT

An unwanted peak occurring due to an antenna sidelobe and an unwanted peak occurring due to a harmonic are eliminated in a radar apparatus. A peak from a target that can cause an unwanted peak is found based on the intensity of the peak, and a search is made for a peak having a predetermined positional relationship with the thus found peak. If such a peak is located, then it is determined whether the peak is a candidate for an unwanted peak, based on the difference between the intensity of the peak and the intensity of the main peak. If both of the paired peaks are determined as being candidates for unwanted peaks, it is determined that the peaks are unwanted peaks.

16 Claims, 4 Drawing Sheets

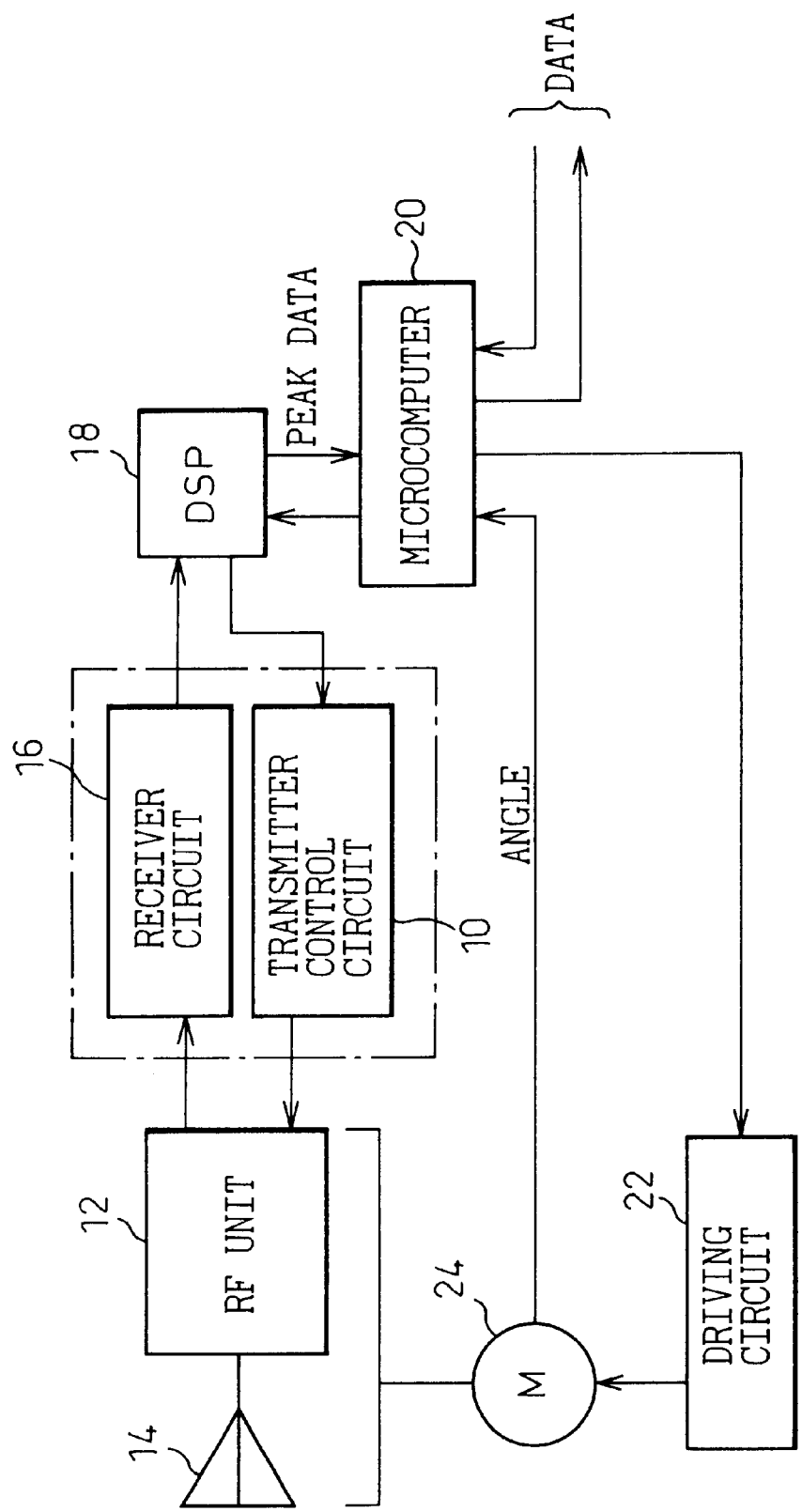

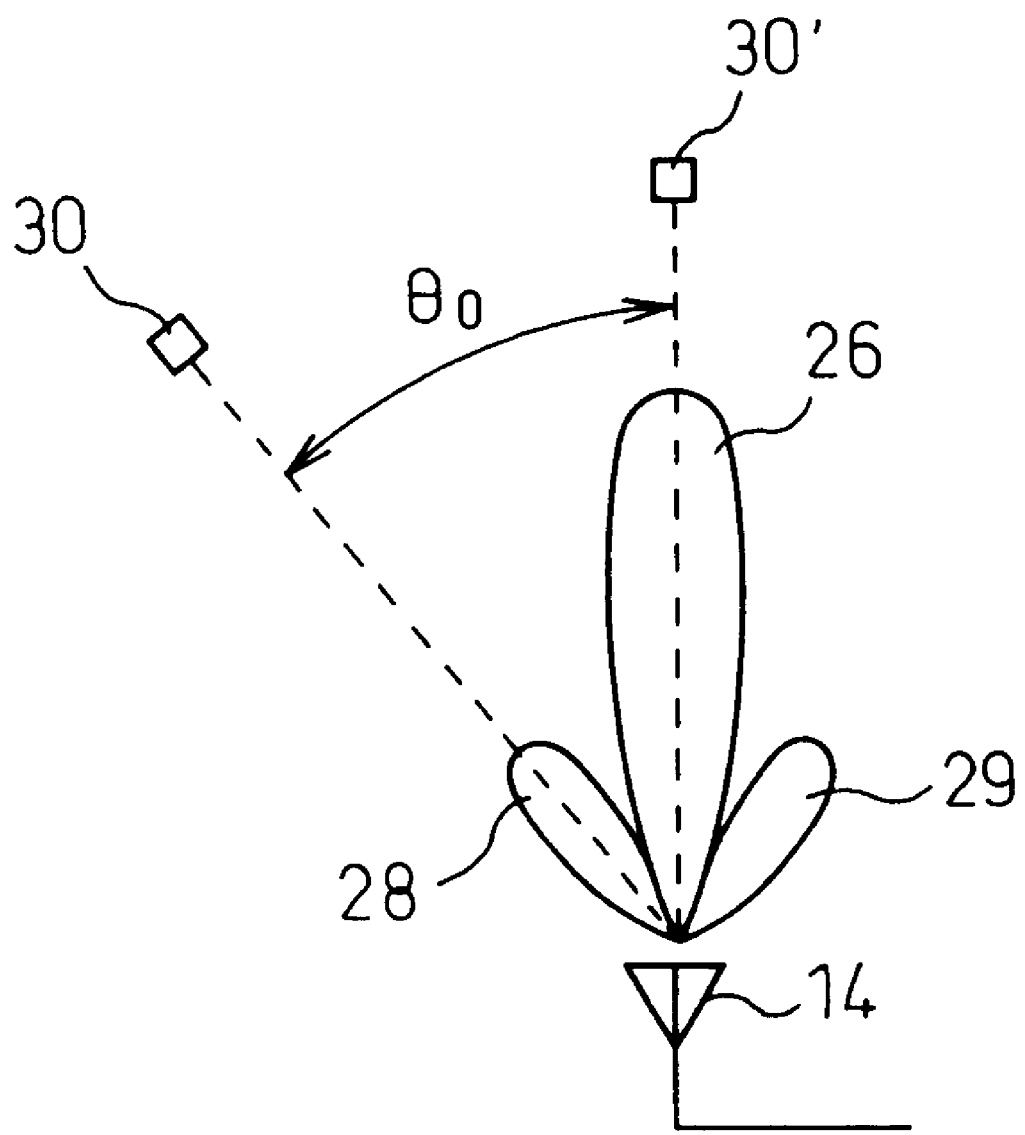

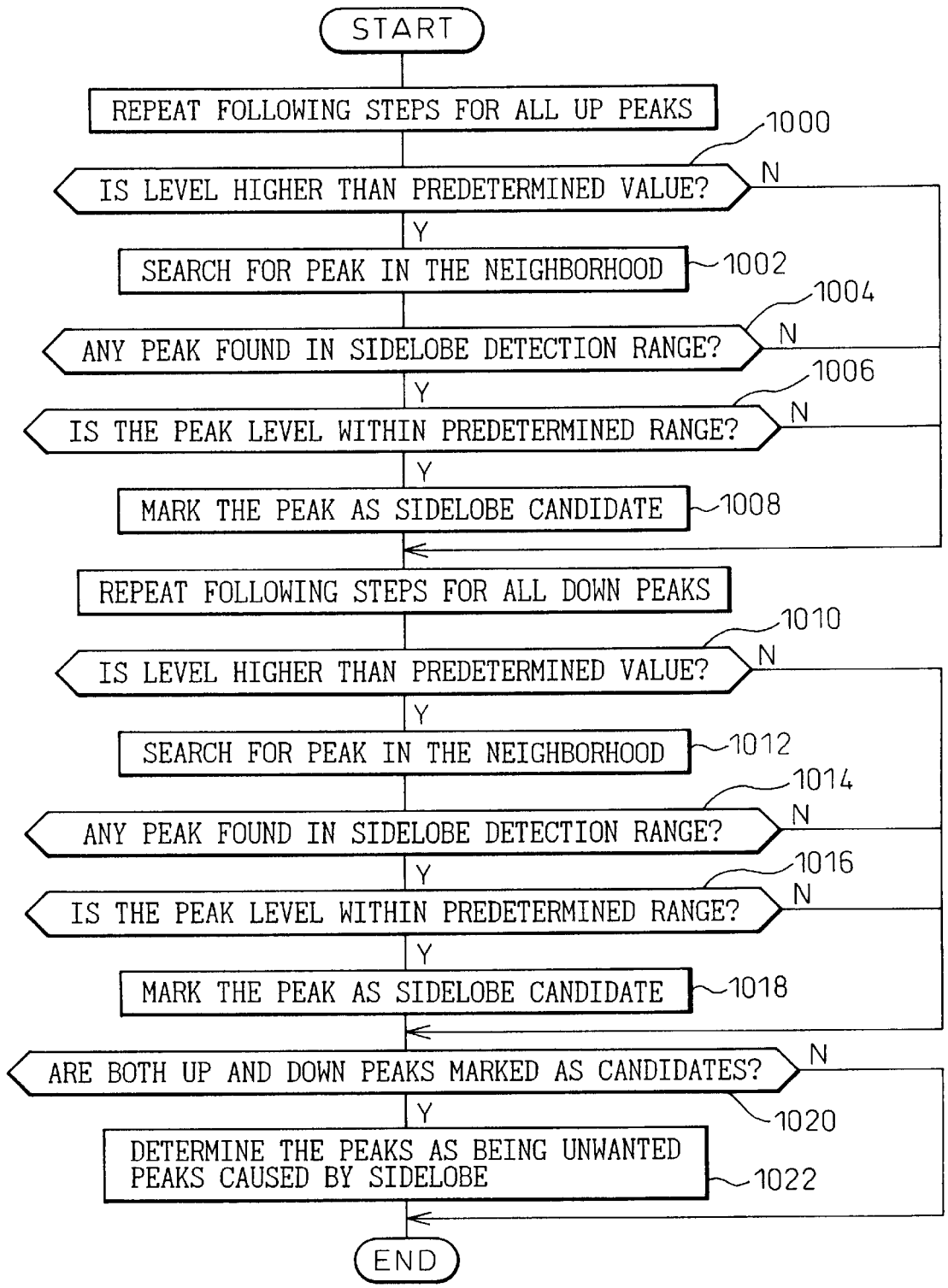

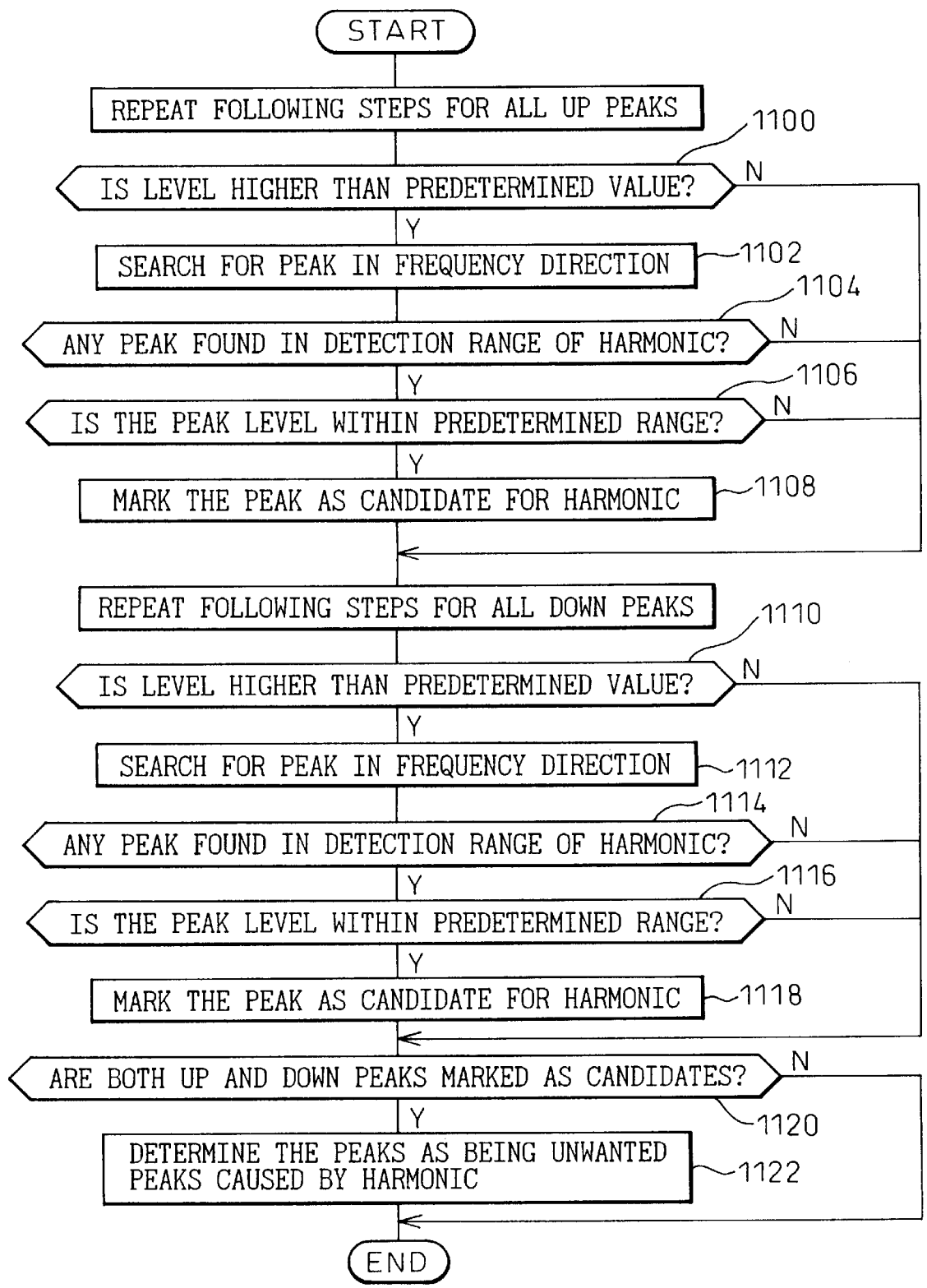

US 6,683,559 B2

UNWANTED PEAK DETECTION FOR RADAR

This application claims priority to Japanese Patent Application No. JP-2001-367028 filed on Nov. 30, 2001.

BACKGROUND OF THE INVENTION

1. Field of the Invention

The present invention relates to an unwanted peak detection apparatus for detecting unwanted peaks caused by antenna sidelobes or harmonics from among peak data output from a radar apparatus and, in particular, from a millimeter-wave radar apparatus.

2. Description of the Related Art

Using millimeter-wave radar (FM-CW radar), the distance to a target located in the path ahead and the relative velocity of the target can be measured at the same time. Further, by scanning the radio wave projection direction, the angle at which the target is located can be determined and, based on the angle, the lateral position of the target can be determined.

However, because of the characteristics of millimeter-wave radar, when a target having a large reflected power is present, the target may be detected in the direction of an angle different from the angle where it should be, due to a sidelobe of the radio wave radiated from the antenna. As no actual target is present at the angle defined by the sidelobe, the result obtained using the peak associated with the sidelobe is a false target, leading to the occurrence of a ghost or an erroneous calculation of the lateral position of the real target.

Further, because of the characteristic of millimeter-wave radar, when a target having a large reflected power is present, a pseudo-reflection due to a harmonic occurs, as a result of signal saturation, in the same angle direction as that of the reflection from the real target. As, usually, no target is present at the position of the harmonic, the result obtained using the peak associated with the harmonic is a false target and appears as a ghost.

SUMMARY OF THE INVENTION

An object of the present invention is to provide an apparatus for detecting unwanted peaks such as a peak due to a sidelobe and a peak due to a harmonic.

According to the present invention, there is provided an unwanted peak detection apparatus for detecting an unwanted peak, from among peaks output from a radar apparatus, and having a frequency and an angle, as parameters indicating peak positions, comprising: means for determining a main peak having an intensity greater than a predetermined threshold value; means for searching for a peak within a region having a predetermined positional relationship with respect to the position of the main peak; and means for determining whether a found peak is an unwanted peak or not, by using a criterion dependent on the intensity of the main peak.

In one example, the searching means searches for the peak within a range where frequency is substantially equal to the frequency of the main peak and where an angle difference relative to the main peak is substantially equal to an angle corresponding to a sidelobe of an antenna of the radar apparatus.

In another example, the searching means searches for the peak within a range where angle is substantially equal to the angle of the main peak and where the frequency is substantially equal to an integral multiple of the frequency of the main peak.

BRIEF DESCRIPTION OF THE DRAWINGS

FIG. 1 is a diagram showing the configuration of a millimeter-wave radar apparatus as one example of a radar apparatus to which the present invention is applied;

FIG. 2 is a diagram for explaining an antenna sidelobe;

FIG. 3 is a flowchart illustrating a process for detecting an unwanted peak due to a sidelobe; and FIG. 4 is a flowchart illustrating a process for detecting an unwanted peak due to a harmonic.

DESCRIPTION OF THE PREFERRED EMBODIMENTS

FIG. 1 shows the configuration of a millimeter-wave radar apparatus as one example of a radar apparatus to which the present invention is applied. In FIG. 1, a transmitter control circuit 10 outputs a triangular wave increasing and decreasing, alternately, in a cyclic fashion. An RF unit 12 generates a millimeter wave frequency-modulated by the triangular wave, and the frequency-modulated wave is radiated from an antenna 14. An echo signal from a target is received by the antenna 14, and the received echo signal is mixed in the RF unit 12 with a portion of the transmitted signal to produce a beat signal having a frequency equal to the difference between the transmitted signal and the echo signal. The beat signal is converted in a receiver circuit 16 to the baseband signal which is fed into a DSP 18. In the DSP 18, conversion from the time domain to the frequency domain is performed by applying FFT on each of the increasing and decreasing sections of the triangular wave. Further, the DSP 18 extracts peaks (up peaks) in the increasing section and peaks (down peaks) in the decreasing section from the frequency spectrum of the signal, and supplies them to a microcomputer 20. On the other hand, a driving circuit 22 scans the projection direction of the antenna 14 by driving a motor 24, and supplies angle data obtained at each instant in time to the microcomputer 20. Based on the intensity of each peak, the antenna angle at that instant in time, and continuity with the previous data, the microcomputer 20 pairs the up peaks, one for one, with the corresponding down peaks (pairing). From the sum of the frequencies of the paired two peaks, the distance to the target is calculated, while from the difference between the frequencies of the two peaks, the relative velocity of the target is calculated. The microcomputer 20 also performs a continuity check based on the target's position and relative velocity data changing from moment to moment.

As shown in FIG. 2, the radio wave radiated from the antenna 14 has a main lobe 26, plus sidelobes 28 and 29 each pointing in a direction a prescribed angle $\theta_0$ off the direction of the main lobe. If a reflection from a target 30 located in the direction of the sidelobe 28 is detected as a peak, the reflection will be erroneously detected as if a target 30' were located in the direction of the main lobe 26. Therefore, the peak caused by this sidelobe must be discriminated from other peaks.

If there is a target 30 that produces a peak not smaller than the minimum detection level due to the presence of the sidelobe 28, then when the antenna 14 is turned by $\theta_0$, a greater peak (hereinafter called the main peak) should occur due to the main lobe 26. In other words, the peak due to the sidelobe appears at the same frequency position as the main peak caused by the main lobe 26, but is displaced by the prescribed angle $\theta_0$ from the main peak, and the peak due to the sidelobe is smaller in intensity (dB) than the main peak by more than a prescribed value. The present invention utilizes this fact to detect the unwanted peak caused by an antenna sidelobe.

FIG. 3 is a flowchart illustrating the process performed in the microcomputer 20 (FIG. 1) to detect a peak caused by a sidelobe.

In FIG. 3, first the intensity of each up peak (each peak detected in the increasing section of the triangular wave) is compared with a predetermined value to see whether the peak has an intensity that can cause a detectable unwanted peak (step 1000). Here, when the minimum detectable peak intensity is denoted by $P_{min}$ (dB) and the difference in intensity between the main peak and a peak due to a sidelobe by $\Delta P$, for example, the predetermined value is given by $\Delta P + P_{min}$.

If a peak having an intensity greater than the predetermined value is found, a search is made for a peak having the same frequency as that peak but located at a position an angle $\theta_0$ away from it (step 1002). In this case, it is desirable that the search range be chosen to have a suitable frequency width centered about the frequency position of that peak and a suitable angle width centered about the angle $\theta_0$. If a peak is found within that range (step 1004), then it is determined whether the intensity of the peak is within a predetermined range in relation to the intensity of the main peak (step 1006). For example, if the peak's intensity difference relative to the main peak is larger than a predetermined threshold value somewhat smaller than the difference $\Delta P$, then it is determined that the intensity is within the predetermined range. If the peak's intensity difference relative to the main peak is within the predetermined range, the peak is marked as being a candidate for an unwanted peak caused by a sidelobe (step 1008).

After performing the above steps 1000 to 1008 on all the up peaks, similar processing is repeated for all the down peaks (peaks detected in the decreasing section of the triangular wave) (steps 1010 to 1018). After that, if both of the paired peaks are peaks marked as being unwanted peak candidates (step 1020), the data output is turned off for such peaks by determining the peaks as being peaks caused by the sidelobe (step 1022). In the continuity check also, the peaks thus determined as having been caused by the sidelobe are treated as peaks caused by the sidelobe, to prevent the data of the correct target from being linked to those of a ghost caused by the sidelobe.

Another problem with the millimeter-wave radar is that, when a target having a large reflected power is present, a peak due to a harmonic occurs because of signal saturation and this also leads to the occurrence of a ghost. The peak due to a harmonic appears at the same angle position as the main peak but at a frequency position equal to an integral multiple of the frequency of the main peak, and its intensity is smaller than the intensity of the main peak by more than a prescribed value.

The present invention utilizes this fact to detect an unwanted peak caused by a harmonic.

FIG. 4 is a flowchart illustrating the process performed in the microcomputer 20 (FIG. 1) to detect a peak caused by a harmonic.

In FIG. 4, first the intensity of each up peak is compared with a predetermined value to see whether the peak has an intensity that can cause a detectable unwanted peak (step 1100). Here, when the minimum detectable peak intensity is denoted by $P_{min}$ (dB) and the difference in intensity between the main peak and a peak due to the second harmonic by $\Delta P$, for example, the predetermined value is given by $\Delta P + P_{min}$.

If a peak having an intensity greater than the predetermined value is found, a search is made for a peak located at the same angle position as that peak but having a frequency equal to an integral multiple of the frequency of that peak (step 1102). In this case, it is desirable that the search range be chosen to have a suitable angle width centered about the angle position of that peak and a suitable frequency width centered about the frequency equal to the integral multiple. If a peak is found within that range (step 1104), then it is determined whether the intensity of the peak is within a predetermined range in relation to the intensity of the main peak (step 1106). For example, if the peak's intensity difference relative to the main peak is larger than a predetermined threshold value somewhat smaller than the difference $\Delta P$, then it is determined that the intensity is within the predetermined range. If the peak's intensity difference relative to the main peak is within the predetermined range, the peak is marked as being a candidate for an unwanted peak caused by the harmonic (step 1108).

After performing the above steps 1100 to 1108 on all the up peaks, similar processing is repeated for all the down peaks (steps 1110 to 1118). After that, if both of the paired peaks are peaks marked as being candidates for unwanted peaks caused by the harmonic (step 1120), the data output is turned off for such peaks by determining the peaks as being peaks caused by the harmonic (step 1122). In the continuity check also, the peaks thus determined as having been caused by the harmonic are treated as peaks caused by the harmonic, to prevent the data of the correct target from being linked to those of a ghost caused by the harmonic.

In the present invention, the detection of a peak due to a sidelobe or a harmonic is performed based on the angle $\theta$, as described above. Alternatively, the detection may be performed based not on the angle $\theta$ but on the lateral direction X calculated from X=r sin$\theta$ (r is the distance to the target); this also falls within the scope of the present invention.

As described above, according to the present invention, the occurrence of a ghost due to a sidelobe or a harmonic is prevented, and the accuracy of continuity check increases.

What is claimed is:

1. An unwanted peak detection apparatus for detecting an unwanted peak from among peaks output from a radar apparatus and having frequency and angle as parameters indicating peak positions, comprising:

part for determining a main peak having an intensity greater than a predetermined threshold value;

part for searching for a peak within a region having a predetermined positional relationship with respect to the position of the main peak; and part for determining whether a found peak is an unwanted peak or not, by using a criterion dependent on the intensity of the main peak.

2. An unwanted peak detection apparatus according to claim 1, wherein the searching part searches for the peak within a range where frequency is substantially equal to the frequency of the main peak and where angle difference relative to the main peak is substantially equal to an angle corresponding to a sidelobe of an antenna of the radar apparatus.

3. An unwanted peak detection apparatus according to claim 2, wherein the determining part determines the peak as being an unwanted peak if the difference between the intensity of the peak and the intensity of the main peak is larger than a predetermined value.

4. An unwanted peak detection apparatus according to claim 2, wherein the radar apparatus outputs peaks during an increasing period as well as a decreasing period of frequency modulation applied to a transmitted wave, and each of the peaks in the increasing period is associated with a corresponding one of the peaks in the decreasing period, and wherein the unwanted peak detection apparatus further comprises part for eliminating the associated peaks if both of the associated peaks are determined as being unwanted peaks.

5. An unwanted peak detection apparatus according to claim 1, wherein the searching part searches for the peak within a range where angle is substantially equal to the angle of the main peak and where frequency is substantially equal to an integral multiple of the frequency of the main peak.

6. An unwanted peak detection apparatus according to claim 5, wherein the determining part determines the peak as being an unwanted peak if the difference between the intensity of the peak and the intensity of the main peak is larger than a predetermined value.

7. An unwanted peak detection apparatus according to claim 5, wherein the radar apparatus outputs peaks during an increasing period as well as a decreasing period of frequency modulation applied to a transmitted wave, and each of the peaks in the increasing period is associated with a corresponding one of the peaks in the decreasing period, and wherein the unwanted peak detection apparatus further comprises part for eliminating the associated peaks if both of the associated peaks are determined as being unwanted peaks.

8. An unwanted peak detection apparatus according to claim 1, wherein the detection of an unwanted peak is performed based on lateral position instead of the angle.

9. An unwanted peak detection method for detecting an unwanted peak from among peaks output from a radar apparatus and having frequency and angle as parameters indicating peak positions, comprising the steps of:

determining a main peak having an intensity greater than a predetermined threshold value;

searching for a peak within a region having a predetermined positional relationship with respect to the position of the main peak; and determining whether the peak searched for is an unwanted peak or not, by using a criterion dependent on the intensity of the main peak.

10. An unwanted peak detection method according to claim 9, wherein, in the searching step, the peak is searched for within a range where the frequency is substantially equal to the frequency of the main peak and where angle difference relative to the main peak is substantially equal to an angle corresponding to a sidelobe of an antenna of the radar apparatus.

11. An unwanted peak detection method according to claim 10, wherein, in the determining step, the peak is determined as being an unwanted peak if the difference between the intensity of the peak and the intensity of the main peak is larger than a predetermined value.

12. An unwanted peak detection method according to claim 10, wherein the radar apparatus outputs peaks during an increasing period as well as a decreasing period of frequency modulation applied to a transmitted wave, and each of the peaks in the increasing period is associated with a corresponding one of the peaks in the decreasing period, and wherein the unwanted peak detection method further comprises the steps of eliminating the associated peaks if both of the associated peaks are determined as being unwanted peaks.

13. An unwanted peak detection method according to claim 9, wherein, in the searching step, the peak is searched for within a range where angle is substantially equal to the angle of the main peak and where frequency is substantially equal to an integral multiple of the frequency of the main peak.

14. An unwanted peak detection method according to claim 13, wherein in the determining step, the peak is determined as being an unwanted peak if the difference between the intensity of the peak and the intensity of the main peak is larger than a predetermined value.

15. An unwanted peak detection method according to claim 13, wherein the radar apparatus outputs peaks during an increasing period as well as a decreasing period of frequency modulation applied to a transmitted wave, and each of the peaks in the increasing period is associated with a corresponding one of the peaks in the decreasing period, and wherein the unwanted peak detection method further comprises the step of eliminating the associated peaks if both of the associated peaks are determined as being unwanted peaks.

16. An unwanted peak detection method according to claim 9, wherein the detection of an unwanted peak is performed based on lateral position instead of the angle.

* * * * *